United States Patent [19]

Schmitz

[11] Patent Number: 5,473,540
[45] Date of Patent: Dec. 5, 1995

[54] ELECTRONIC CONTROLLER FOR VEHICLE

[75] Inventor: Heinz E. Schmitz, Bremm, Germany

[73] Assignee: Delco Electronics Corp., Kokomo, Ind.

[21] Appl. No.: 180,821

[22] Filed: Jan. 10, 1994

Related U.S. Application Data

[63] Continuation of Ser. No. 754,888, Sep. 4, 1991, abandoned.

[30] Foreign Application Priority Data

Sep. 6, 1990 [GB] United Kingdom ............... 9019423

[51] Int. Cl.$^6$ .................................................. B60K 41/00
[52] U.S. Cl. ............................ 364/424.05; 364/424.03; 364/424.04; 364/431.12; 364/551.01
[58] Field of Search .................... 364/424.01, 424.04, 364/551, 551.01, 424.03, 424.05, 483, 143, 424.07, 571.04, 431.11, 431.12; 395/425, 375, 550, 275, 800; 73/116, 118.1, 117.3

[56] References Cited

U.S. PATENT DOCUMENTS

| | | | |
|---|---|---|---|
| 4,275,455 | 6/1981 | Bartlett | 364/143 |
| 4,291,375 | 9/1981 | Wolf | 364/483 |
| 4,530,069 | 7/1985 | Desrochers | 395/275 |
| 4,534,012 | 8/1985 | Yokozawa | 395/275 |
| 4,539,636 | 9/1985 | Sääksjärvi | 395/550 |
| 4,720,810 | 1/1988 | Binarsch et al. | 364/900 |
| 4,757,463 | 7/1988 | Ballou et al. | 364/551 |
| 4,796,206 | 1/1989 | Boscove et al. | 364/551.01 |
| 4,831,560 | 5/1989 | Zaleski | 364/551.01 |
| 4,975,846 | 12/1990 | Abe et al. | 364/424.03 |
| 4,975,848 | 12/1990 | Abe et al. | 364/424.03 |
| 4,996,643 | 2/1991 | Sakamoto et al. | 364/424.03 |
| 5,050,080 | 9/1991 | Abe | 364/424.04 |
| 5,113,344 | 5/1992 | Kellogg et al. | 364/424.04 |
| 5,157,610 | 10/1992 | Asano et al. | 364/424.03 |
| 5,251,304 | 10/1993 | Sibigtroth et al. | 395/425 |
| 5,252,812 | 10/1993 | Nakamura | 395/425 |
| 5,252,967 | 10/1993 | Brennan et al. | 340/870.02 |

FOREIGN PATENT DOCUMENTS

| | | |
|---|---|---|
| 0098915 | 3/1983 | European Pat. Off. . |
| 0266704 | 10/1987 | European Pat. Off. . |
| 3610620 | 10/1987 | Germany . |
| 3802241 | 8/1989 | Germany . |
| 3807999 | 9/1989 | Germany . |
| 3822844 | 1/1990 | Germany . |
| 1354290 | 5/1974 | United Kingdom . |
| 2096797 | 10/1982 | United Kingdom . |
| 2151049 | 7/1985 | United Kingdom . |
| 2210179 | 6/1989 | United Kingdom . |
| 2232272 | 12/1990 | United Kingdom . |
| 89/04425 | 5/1989 | WIPO . |
| 89/06181 | 7/1989 | WIPO . |

Primary Examiner—Kevin J. Teska
Assistant Examiner—Jacques H. Louis-Jacques
Attorney, Agent, or Firm—Mark A. Navarre

[57] ABSTRACT

An electronic controller 16 for use in controlling vehicle operation comprises first and second memories 22,24, the first containing a plurality of control procedures and data values for controlling the operation of the controller for use with a plurality of different vehicle types, the second containing a plurality of pointers for selecting an appropriate control procedure and appropriate data values for the particular type to which the controller 16 is fitted. Therefore, a single controller 16 can be used with a plurality of different vehicle types. A portable programmer 20 communicates with a host computer 12 of a vehicle assembly line 1 and programs the controllers 16 under control of the host 12. A programming unit 50 is provided at service garages for reprogramming fitted controllers 16 or for programming replacement controllers 16', and can communicate with the host computer 12 for control thereby. The possibility of human error in providing the correct controller 16 for a particular vehicle 10, or in reprogramming a fitted controller 16 or programming a replacement controller 16'is eliminated.

1 Claim, 4 Drawing Sheets

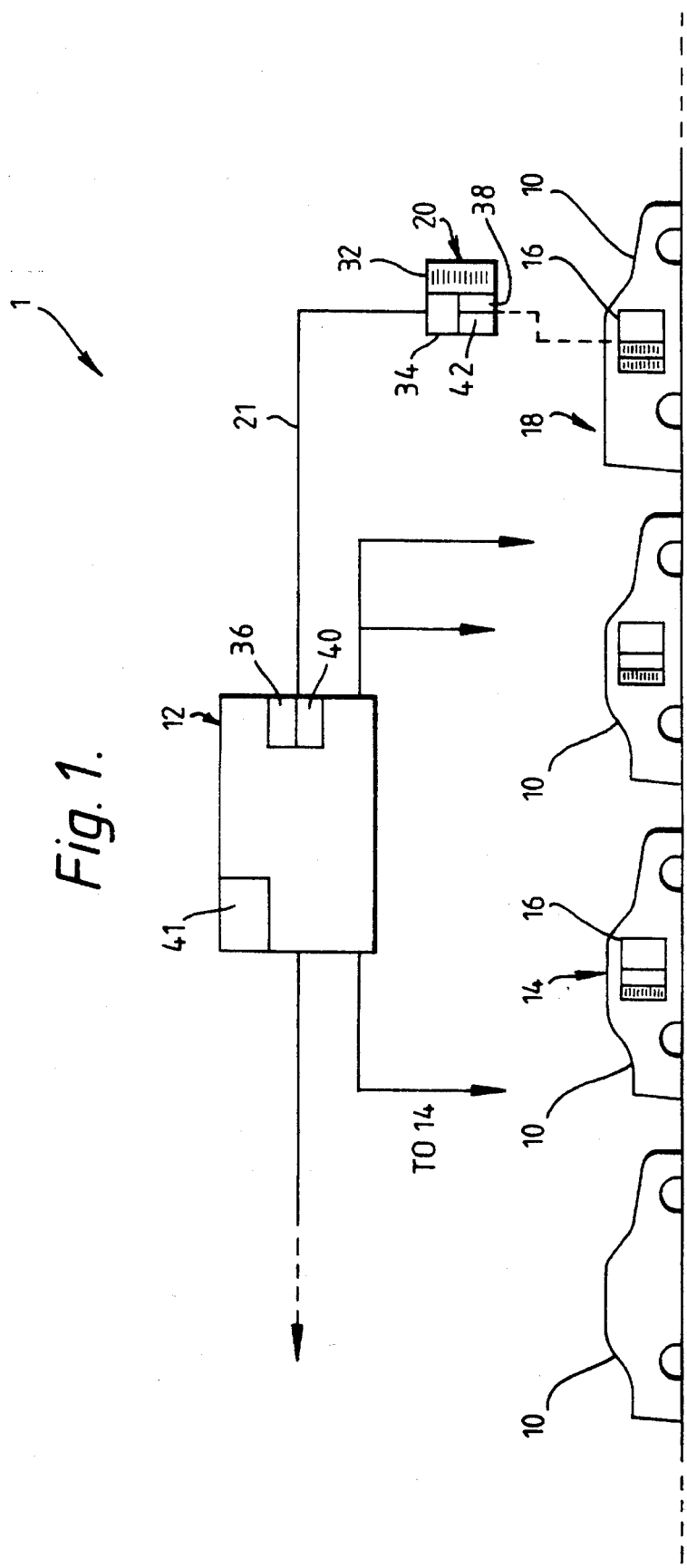

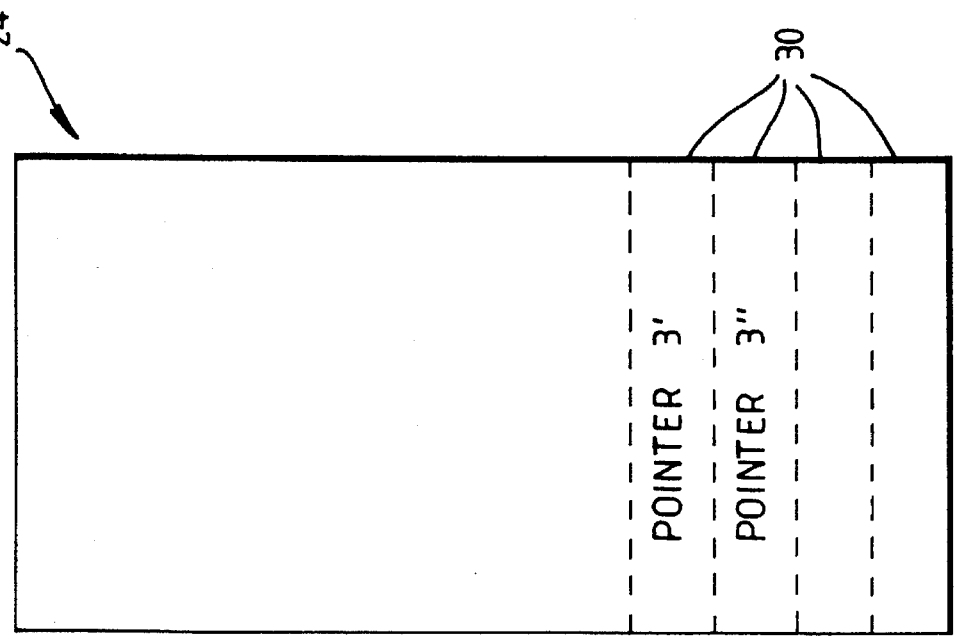
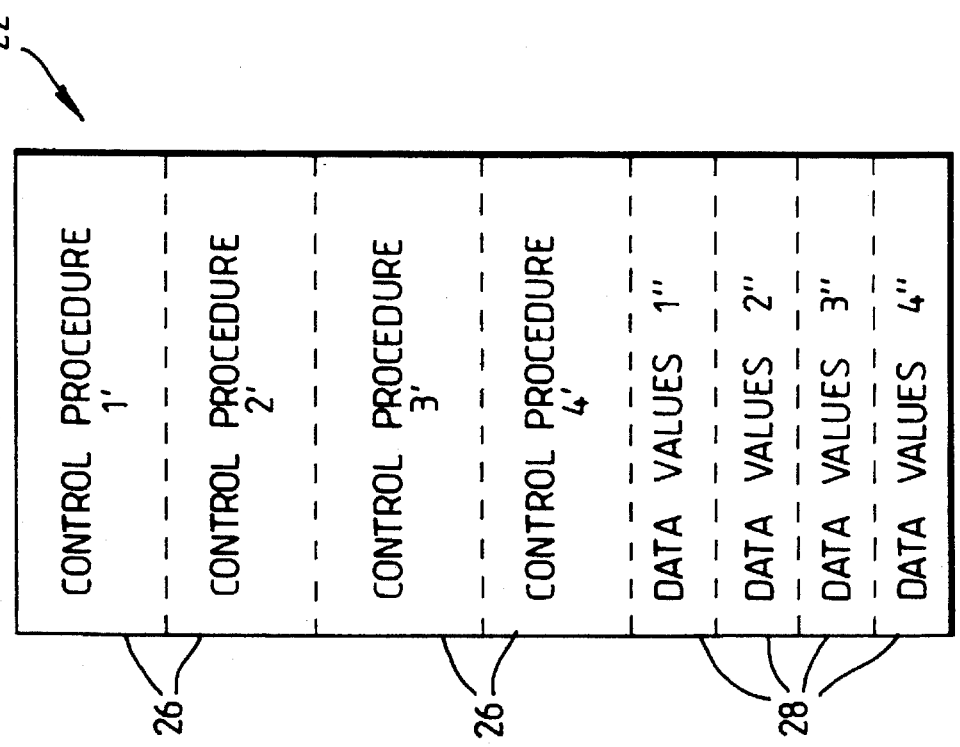

5,473,540

ELECTRONIC CONTROLLER FOR VEHICLE

This is a continuation of application Ser. No. 07/754,888 filed on Sept. 4, 1991 now abandoned.

BACKGROUND OF THE INVENTION

This invention relates to an electronic controller for use in controlling the operation of a vehicle.

Typically, electronic controllers are used to control the operation of the vehicle engine, and in particular aspects such as spark timing, spark dwell times, amounts of emission, fuel requirements, and also other aspects of the vehicle such as the gear box and the air conditioning. Each controller is normally programmed to operate with a variety of sensors for monitoring the operation of the vehicle to which it is fitted. The sensors are also used to obtain optimum performance of the vehicle by comparing the values they measure with predetermined calibration values, representative of optimum operating criteria, stored in a memory of the controller.

Different optimum operating criteria are usually applicable for different vehicles and also for the cases where different engines are used in the same vehicle body or the same engine is fitted in different vehicle bodies, in other words different optimum operating criteria normally apply for different vehicle types. Each electronic controller is programmed to suit the particular vehicle type to which it is to be fitted so that it controls the vehicle in accordance with the individual characteristics of that vehicle type.

DESCRIPTION OF THE PRIOR ART

The program procedures and data values (which include calibration values and other values upon which the program procedures are based) are stored in a memory of the electronic controller before it is fitted to the vehicle.

If a problem with the electronic controller develops during use of the vehicle, the vehicle is usually taken to a service garage for replacement with a new controller supplied to the service garage by the vehicle manufacturer after programming.

A problem associated with the prior art type of electronic controller is that it is possible to fit the wrong controller to a vehicle on the assembly line, for example by fitting an electronic controller programmed for another vehicle type located at some other point along the assembly line. Additionally, it is necessary to store large numbers of electronic controllers to have a sufficient number of controllers suited each different vehicle type, and also to have a large number of controllers at the assembly line.

Another problem is that replacement of the controller by a service garage takes a long time since it is necessary to order a new controller from the manufacturer.

SUMMARY OF THE INVENTION

The present invention seeks to provide an improved electronic controller for a vehicle.

According to an aspect of the present invention, there is provided an electronic controller for controlling the operation of a vehicle, the electronic controller being adapted to operate in accordance with a control procedure, and comprising a first memory containing a plurality of control procedures, and a second memory containing one or more pointers adapted to select a control procedure from the first memory, thereby causing the controller to operate in accordance with the chosen control procedure. A single electronic controller is therefore suitable for a variety of vehicle types, so that the same controller can be fitted to all vehicles which are to have such a controller, and programmed fully after fitting programming of the second memory can be relatively simple, especially due to the small amount of data to be written into it. Of course, the first and second memories could be a single memory configured in two parts.

In order to reduce duplication of the software involved between different control procedures, the first memory may contain a plurality of routines adapted to form a plurality of control procedures, and the pointer or pointers in the second memory are adapted to select and/or assemble the routines so as to form the chosen control procedure. Additionally, the second memory may also contain one or more routines adapted to cooperate with routines in the first memory, a control procedure being formable by a combination of routines from the first and second memories. Thereby, additions may be made to the control procedures, for example if an another sensor or the like is added to the vehicle, without it being necessary to reprogram the first memory. Similarly, the second memory may comprise one or more routines adapted to replace one or more routines in the first memory, thereby to form a control procedure containing one or more replacement routines: thereby enabling the control procedures in the first memory to be readily improved or altered.

In an embodiment, the first memory contains one or more data values for use with the control procedures, and the pointer or pointers in the second memory are adapted to select one or more data values for use with the chosen control procedure. As will be apparent, the second memory may contain one or more data values for use with the chosen control procedure, one or more of which may be adapted to replace one or more data values in the first memory. Preferably, the data values contained in the first memory are substantially more permanent than the data values contained in the second memory. More efficient use of the first and second memories can thereby be obtained. All the data values may, alternatively, be stored in the second memory.

Advantageously, the chosen control procedure bases its operation on the actual operation of the vehicle. Therefore, the chosen control procedure may comprise means to detect operating parameters of the vehicle and to control the operation of the vehicle in dependence upon the detected parameters and upon calibration data contained in the selected data values.

In a preferred embodiment, the first memory is an EPROM and the second memory is an EEPROM. Of course, any suitable memory types could be used.

Another aspect of the present invention provides, programming apparatus for programming an electronic controller fitted to a vehicle in an unprogrammed or partially programmed state, the apparatus comprising identifying means for identifying the vehicle type to which the electronic controller is fitted; generating means for generating program data for use in programming the electronic controller, appropriate for the identified vehicle type; and transferring means for transferring the generated program data to a memory of the electronic controller.

Preferably, the apparatus comprises a host adapted to control the operation of one or more of the identifying means, the generating means and the transferring means. Program data can be written to the second memory, and thus the electronic controller can be programmed entirely under computer control to minimize the possibility of human error, and as a consequence also reduces the possibility of having the wrong electronic controller provided in a vehicle.

The programming apparatus may comprise a portable programmer which includes the transferring means, and communication means for communicating with the host for control thereby, the portable programmer being connectable to the electronic controller for transferring generated program data thereto. The portable controller could be a computer having a portable connector or interface for communicating with the electronic controller.

Preferably, the portable programmer comprises a memory for storage of a plurality of different program data for use in a plurality of vehicle types, the appropriate program data being selected by the generating means in dependence upon the vehicle type identified by the identifying means. Advantageously, the host comprises means to store or change program data in the memory of the portable programmer.

In a preferred embodiment, the host is part of a control system for a vehicle assembly line for controlling the assembly of vehicles, and comprises position determining means, of which the identifying means forms part, to determine the position of a particular vehicle on the assembly line, and thereby to identify the vehicle type at the position at which the portable programmer is located; and means to indicate the vehicle type to the portable programmer. Advantageously, the host comprises a memory for storing the vehicle type and chassis number, or other data relating to the particular vehicle to which the electronic controller is fitted. This provides a reference system for checking this data at a later date, for example when replacing or reprogramming the electronic controller, to minimize the risk of incorrect programming by, for example, service garages.

According to another aspect of the present invention, there is provided a method of providing a vehicle with an electronic controller adapted for controlling the operation of the vehicle, comprising the steps of fitting an electronic controller to the vehicle; identifying the vehicle type to which the electronic controller is fitted; generating program data appropriate for the identified vehicle type; and transferring the generated program data to a memory of the electronic controller, thereby to program the electronic controller. Where the electronic controller comprises first and second memories connected to one another, the method advantageously comprises the steps of storing in the first memory a plurality of control procedures relating to a plurality of vehicle types; and storing in the second memory one or more pointers adapted to chose an appropriate control procedure from the first memory in dependence upon the identified vehicle type. Preferably, the method comprises the step of storing the control procedures in the first memory prior to fitting the electronic controller to the vehicle.

In an embodiment, the method comprises the step of storing in the first memory data values that are substantially more permanent than the data values that are stored in the second memory. Wastage of memory space can thereby be reduced.

In a preferred embodiment, the method comprises the step of storing in the memory of the electronic controller a code indicative of vehicle type.

The invention is also directed to apparatus for replacing or reprogramming electronic controllers, and to a method of doing such.

Accordingly, another aspect of the invention provides apparatus for providing a replacement or reprogrammed electronic controller in a vehicle, which electronic controller comprises a memory in which is storable program data upon which the operation of the electronic controller is based, the apparatus comprising a portable programming unit; a programming memory containing a plurality of different program data; means for identifying the vehicle type; means for selecting from the programming memory program data appropriate for the identified vehicle type; and means for transferring to the memory of the electronic controller the selected program data.

The apparatus may comprise means to erase the memory of the electronic controller fitted to the vehicle for reprogramming purposes.

In an embodiment, the apparatus may comprise means for obtaining from a host memory information for use in programming the electronic controller with the appropriate program data, and may also comprise means for receiving from the host memory data for use in modifying the program data stored in the programming unit or selected from the memory of the programming unit.

Preferably, the apparatus comprises means for comparing information obtained from the host memory with data indicative of vehicle type and/or vehicle chassis number or other specific vehicle identification data, thereby checking the accuracy of the data.

Advantageously, the apparatus comprises means to access the program data from the memory of the electronic controller fitted to the vehicle; and a memory to store temporarily the accessed program data, whereby the accessed program data can be transferred to a replacement electronic controller.

Another aspect of the present invention provides, a method of reprogramming an electronic controller in a vehicle, which electronic controller comprises a memory in which is storable program data upon which the operation of the electronic controller is based; the method comprising the steps of identifying the vehicle type; selecting appropriate program data from a memory of a portable programming unit containing a plurality of different program data in dependence upon the identified vehicle type; and transferring the stored program data into the memory of the electronic controller.

A further aspect provides, a method of replacing an electronic controller in a vehicle, which electronic controller comprises a memory in which is storable program data upon which the operation of the electronic controller is based; the method comprising the steps of identifying the vehicle type; selecting appropriate program data from a memory of a portable programming unit containing a plurality of different program data in dependence upon the identified vehicle type, or reading the program data stored in the memory of the electronic controller previously fitted to the vehicle and storing the read program data temporarily in a programming memory associated with the programming unit; fitting a replacement electronic controller to the vehicle; and transferring the selected or stored program data into the memory of the replacement electronic controller.

Preferably, the replacement electronic controller is fitted to the vehicle before the selected or stored program data is transferred to its memory.

The method may comprise the steps of determining whether there is available a modified control procedure or modified data values appropriate for the identified vehicle type, and transferring to the electronic controller such modified control procedure and/or data values.

According to another aspect of the present invention, there is provided programming apparatus for programming an electronic controller for a vehicle, comprising identifying means for identifying the vehicle type to which the electronic controller is to be fitted; generating means for generating program data for use in programming the electronic controller and a code representative of vehicle type, appropriate for the identified vehicle type; transferring means for transferring the generated program data and vehicle type code to a memory of the electronic controller; and detection means for reading the vehicle type code from the memory of the electronic controller after fitting the electronic controller to a vehicle, and for comparing the vehicle type code with the identified vehicle type, thereby determining whether the electronic controller is correctly programmed for the vehicle to which it is fitted.

A further aspect provides a method of programming an electronic controller for a vehicle, comprising the steps of identifying the vehicle type to which the electronic controller is to be fitted; generating program data for use in programming the electronic controller and a code representative of vehicle type, appropriate for the identified vehicle type; transferring the generated program data and vehicle type code to a memory of the electronic controller; reading the vehicle type code from the memory of the electronic controller after fitting the electronic controller to the vehicle; and comparing the vehicle type code with the identified vehicle type, thereby determining whether the electronic controller is correctly programmed for the vehicle to which it is fitted.

BRIEF DESCRIPTION OF THE DRAWINGS

An embodiment of the present invention is described below, by way of illustration only, with reference to the accompanying drawings, in which:

FIG. 1 is a schematic diagram of part of a vehicle assembly line;

FIGS. 2a and 2b show a first embodiment of memory maps for an embodiment of electronic controller;

DETAILED DESCRIPTION OF THE PREFERRED EMBODIMENTS

Figure 3B:
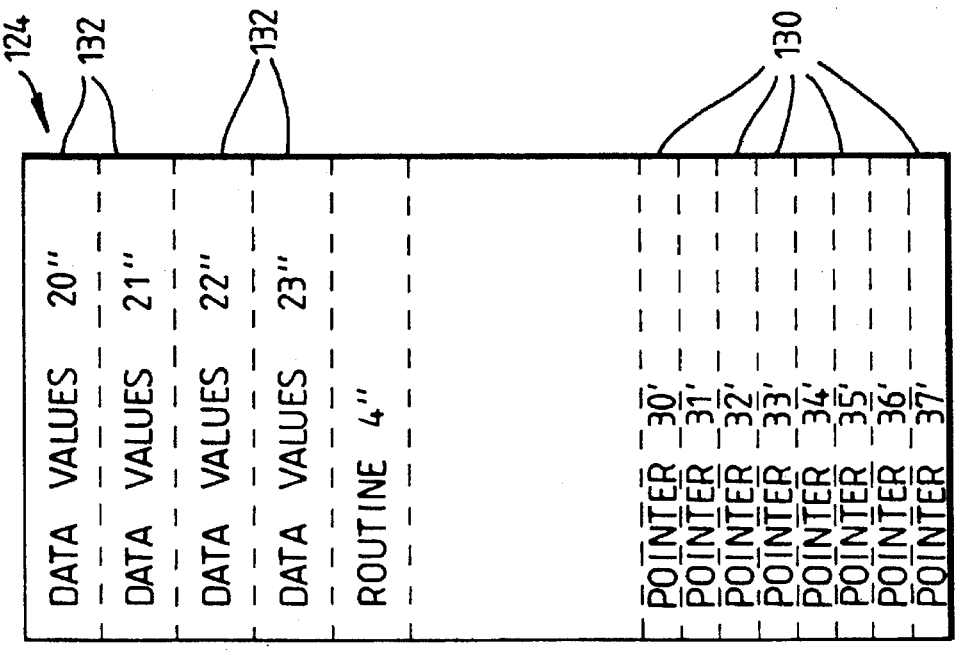
FIGS. 3a and 3b show a second embodiment of memory maps for an embodiment of electronic controller.

FIG. 1 shows part of a vehicle assembly line 1 carrying a plurality of vehicles 10 of different types. A host computer 12, of substantially conventional form, monitors the progress of the assembly of the vehicles 10 and also controls the operation of machinery or the like associated with the assembly line. It can also provide data as to which parts are required for any particular vehicle on the assembly line 1.

At point 14 on the assembly line, an electronic controller 16 is fitted to those vehicles to which such a controller is to be fitted.

The electronic controller 16 is fitted in a partially programmed state and is only fully programmed at a later point in the assembly line 1. The final programming is carried out by a portable programmer 20, located at point 18 of the assembly line, under the control of the host computer 12. A communications link 21 between the host 12, which can be thought of as having identifying means 36 for identifying the vehicle type before the programmer 20, and the programmer 20 enables the host 12 to instruct the programmer 20 as to what vehicle type is positioned before it, thereby causing the programmer 20 to generate and transfer to the controller 16, by means of generating means 34 and transferring means 38, the correct program data for that particular vehicle type. In order to be able to implement modifications and additions to the program data, the host 12 includes a controller 40 adapted to store or change program data in the memory of the programmer 20.

The program data, formed of software routines and/or data values, is stored in a suitable memory of the controller 16, a first embodiment of which can be seen in the memory maps of FIGS. 2a and 2b. The memory is formed of two distinct blocks of memory, of which the first memory block 22 has the memory map shown in FIG. 2a, and the second memory block 24 has the memory map shown in FIG. 2b.

Data stored in the first memory 22 comprises a plurality of control procedures 26, each of which contains the software routines for a particular vehicle type, and a plurality of blocks of data values 28 for use by a respective control procedure 26 and containing data values suitable for the particular vehicle type to which they are associated. Each of the data values includes the necessary calibration values for its associated vehicle type.

The second memory 24 contains a plurality of pointers which are used in accessing the desired control procedure 26 and block of data values 28 from the first memory 22. For example, the second memory 24 contains the pointers 3' and 3" for accessing control procedure 3' and data value block 3".

The first memory 22 can therefore be the same for all the vehicle types, with the electronic controller 16 being programmed for a particular vehicle type by suitable programming of the second memory 24.

Figure 3A:
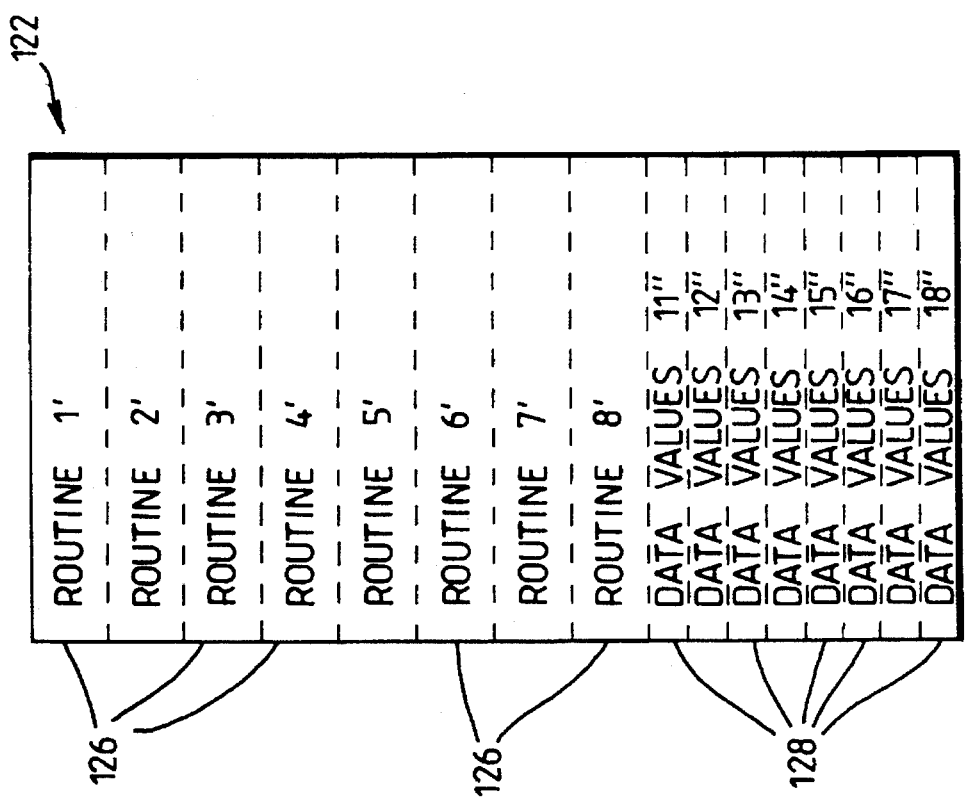

Since there is usually duplication of some of the software routines and data values from one vehicle type to another, it is possible to make use of this duplication to reduce the amount of memory needed in the controller 16. A second embodiment of memory for the controller which makes use of such duplication is shown in the memory maps of FIGS. 3a and 3b.

The first memory 122 comprises a plurality of routines 126 which can be assembled into control procedures, and a plurality of individual data values 128, which include the necessary calibration values. In the plurality of routines 126, there are typically routines which are common to two or more vehicle types, so can be used in two or more different control procedures, and routines which are suitable only for a single vehicle type, so can be used only in the control procedure for that vehicle type. The situation is typically the same with the data values 128.

The second memory 124 contains a plurality of pointers 130, which together select and assemble routines 126 into a control procedure suitable for the particular vehicle type with which the pointers are associated. The pointers also select the appropriate data values 128 for use with the assembled control procedure.

Contained in the second memory 124 is also a plurality of data values 132 to be used in the assembled control procedure and are selectable by the pointers 130.

As with the first memory 22 of the first embodiment, the first memory 122 of this embodiment can store control procedures (in unassembled form) suitable for a variety of vehicle types, whilst the second memory stores pointers, and also additional data values, to select and assemble the appropriate control procedure from the first memory for the particular vehicle type in which the controller 16 is fitted.

The second memory 124 can also contain additional routines (not shown) for assembly with routines from the first memory 122 into the control procedure. Similarly, replacement routines (not shown) can be stored in the second memory 124 and accessed instead of the corresponding routines of the first memory by appropriate selection of pointers 130.

Data is written into the first memory 22 or 22 of the controller 16 before the controller is fitted to a vehicle 10. Since all the controllers 16 have identical program data in their first memories 22,122, the program data can be written into these memories in batch form. On the other hand, program data is written into the second memory 24 or 124 after the controller 16 has been fitted to the vehicle 10, but while the vehicle is still on the assembly line 1. This is done by the portable programmer 20 under control of the host computer 12.

For the purposes of programming the second memory 24,124, the programmer 20 is provided with a memory 32 which contains program data for all the vehicle types which it is to program, and with transferring means 38, in the form of a plug and a suitable interface, to connect the programmer 20 to the controller 16. The host simply instructs the programmer 20 what vehicle type is positioned before it, to enable the programmer 20 to select the appropriate program data for that vehicle type from the programmer memory 32. The data is then written into the second memory of the controller 16 through the transferring means 38 of the programmer 20, thereby programming the controller 16 for that particular vehicle type.

New or replacement routines or data values can best be programmed into the controller 16 in one of two ways. First, the host computer 12 can transfer the new routines and data values to the programmer 20 at the time it instructs the programmer 20 of the vehicle type before it, so that the data values and routines are transferred to the controller 16 at the same time as the program data from the programmer 20. Alternatively, such data values and routines can be transferred to the programmer when they are produced, and stored in the memory of the programmer 20 for subsequent transfer to the controller 16.

As a security measure, when the program data is written into the second memory 24,124, a code representative of vehicle type is also written into this memory, and is readable subsequently to identify the vehicle type for which the controller has been fitted. This data may relate to the vehicle type and the chassis number for the particular vehicle.

In an alternative embodiment, data is written into the second memory 24,124 before the electronic controller 16 is fitted to the vehicle 10. At a convenient point on the assembly line 1, the host computer 10 reads the vehicle type identification code from the second memory 24,124, by means of a detector 42 incorporated in the portable programmer 10 or with any other suitable tester, and verifies that it corresponds to the vehicle type scheduled to be at that point on the assembly line at the time of the test. A discrepancy between the two identified vehicle types indicates that the controller 16 is incorrectly programmed for the vehicle type to which it is fitted. The controller 16 can then be replaced with a correctly programmed controller, or reprogrammed by replacing the pointers, and if applicable the routines and data values, in the second memory 24,124.

Figure 4:
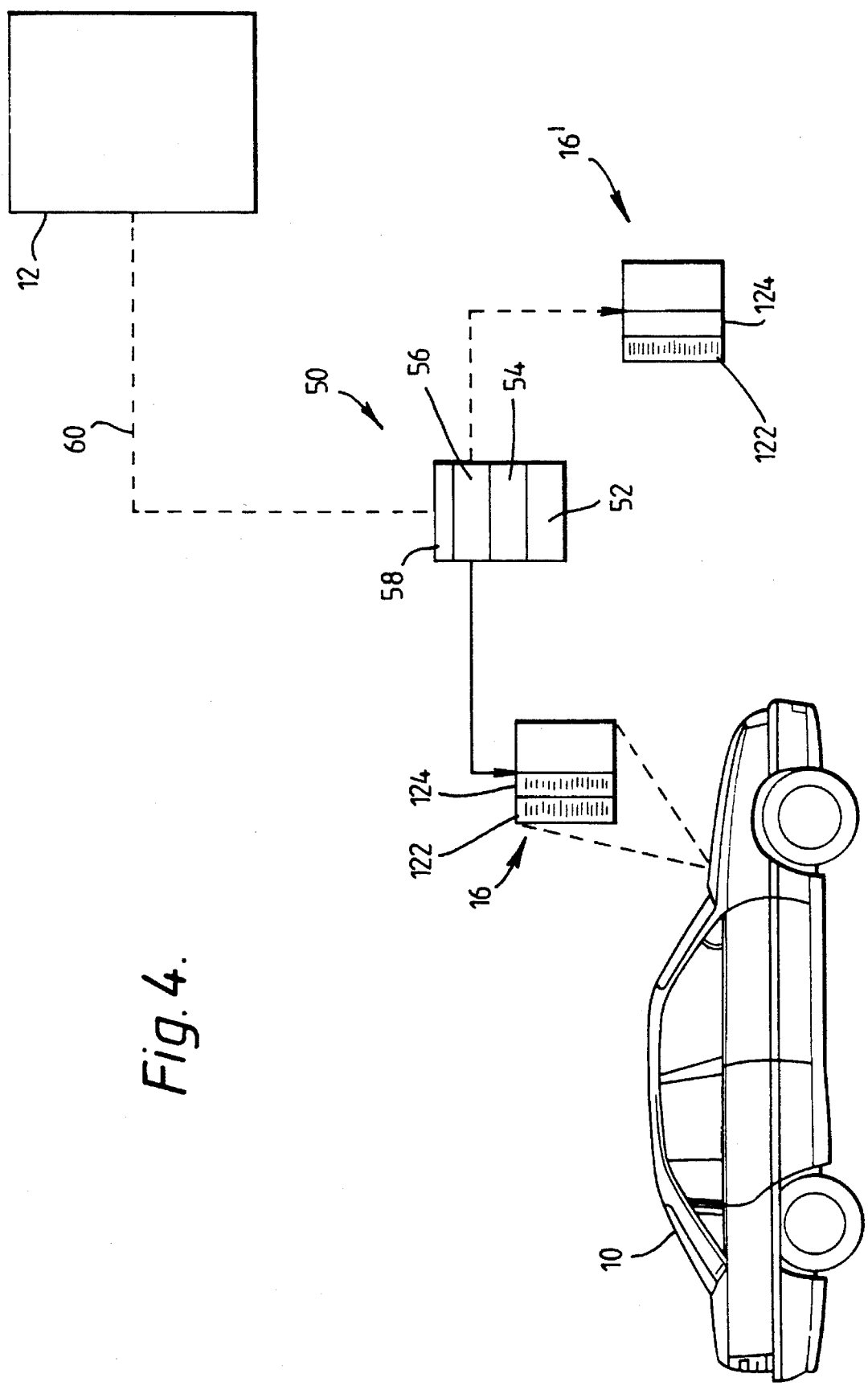
FIG. 4 is a schematic diagram of apparatus for replacing or reprogramming an electronic controller.

If at any point during the life of the vehicle 10, it is necessary to replace or reprogram the controller 16, this can be done at a service garage by use of the apparatus shown in FIG. 4. Replacement may be required if, for example, the controller develops a fault or is damaged beyond repair. Reprogramming might be required if, for example, the physical characteristics of the vehicle change due to wear or important design changes.

Referring to FIG. 4, the apparatus comprises a portable unit 50 having a memory 52, a tester 54 for testing a fitted controller 16, programming circuitry 56 for programming a new controller 16' or reprogramming the fitted controller 16, and communications circuitry 58.

Also contained in the unit 50, which in this embodiment forms part of the tester 54, is circuitry to read from the second memory 24,124 of the controller 16 the code representative of the vehicle type.

The memory 52 contains program data of all the vehicle types which the service garage is likely to encounter, together with program data for different versions of the same vehicle types, in which modifications have been made which are not compatible with earlier designs.

In use, the tester 54 tests the fitted controller 16, by means of a number of appropriate predetermined test procedures, to determine whether the fitted controller 16 needs replacement or reprogramming, and supplies the results to the programming circuitry 56. In addition to carrying out the tests, the tester 54 reads the vehicle identification code stored in the second memory 24,124 and stores it temporarily in the memory 52. If the fitted controller 16 requires reprogramming, the programming circuitry 56 erases the second memory 24,124 of the controller 16, if necessary, and then transfers the appropriate new program data to it from the memory 52 in accordance with the identified vehicle type. On the other hand, if a new controller 16' is to be fitted to the vehicle, the programming circuitry simply transfers the appropriate program data to the second memory 24,124 of the new controller 16' before or after it is fitted to the vehicle 10. In both cases, the vehicle identification code is transferred back to the second memory 24,124 by the programming circuitry 56.

The communications link 60 is provided to enable the unit 50 to communicate with the host computer 12 during testing or programming. For example, it can be used to transfer new program data to the memory 56 of the unit 50 to enable design changes to be incorporated to vehicles during servicing or replacement of the controller 16.

It can also be used to add an extra level of security to the system and thereby to reduce the risk of unauthorized reprogramming of electronic controllers 16. For example, in one embodiment the controller 16 is designed so that it can only be reprogrammed once the unit 50 has verified with the host 12 that the vehicle type identification code read from the second memory 24,124 of the fitted controller 16 corresponds to the host's record of vehicle type for that vehicle chassis number, stored in a memory 41 of the host 12. A programming disable or a write disable facility could be provided in the unit 50 or controller 16 respectively to ensure that programming can not be carried out if there is no such correspondence.

Since the amount of human input to the replacement and reprogramming stages is kept to a minimum, the chances of errors are reduced considerably. Additionally, the service garage can keep a small stock of replacement controllers 16' which will be suitable for all vehicle types and which can always be programmed so as to be up to date with the latest developments, simply by updating the memory of the programming unit 50, which can, of course be done via the communications link 60. Replacement and reprogramming of controllers 16 can therefore be quick and simple.

The embodiments of the invention in which an exclusive property or privilege is claimed are defined as follows:

1. Programmable electronic control apparatus for a vehicle, comprising:

an electronic controller for a vehicle, including a programmable memory for storing a plurality of vehicle specific pointers which activate control procedures specific to a vehicle in which the controller will be installed;

a host computer for identifying the type of vehicle in which the controller is to be installed and for generating a type code corresponding to said identified vehicle type;

a portable programmer having a memory for storage of a plurality of different pointers based on vehicle type, and means for transferring a selected set of pointers along with the type cede generated by said host computer to the programmable memory of said electronic controller; and detection means for reading the type code from the programmable memory of said electronic controller after said controller is installed in said vehicle, for independently identifying the type of vehicle in which the controller has been installed, and for comparing the read type code with the identified vehicle type to verify that the electronic controller is correctly programmed for the vehicle in which it is installed.

* * * * *